United States Patent
Cosman (10) Patent No.: US 8,810,454 B2
(45) Date of Patent: Aug. 19, 2014

(54) POWER-AWARE TIERED GEOFENCING AND BEACON WATCHLISTS

(75) Inventor: Stephen James Cosman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 210 days.

(21) Appl. No.: 13/272,241

(22) Filed: Oct. 13, 2011

(65) Prior Publication Data

US 2013/0093627 A1     Apr. 18, 2013

(51) Int. Cl.
     *G01S 3/02*      (2006.01)

(52) U.S. Cl.
     USPC ............................................ 342/451; 342/458

(58) Field of Classification Search
     USPC ................. 342/386, 451, 457, 458, 463–465; 455/456.1, 456.6
     See application file for complete search history.

(56) References Cited

U.S. PATENT DOCUMENTS

| | | | |
|---|---|---|---|
| 7,639,131 | B2 | 12/2009 | Mock et al. |
| 7,913,179 | B2 | 3/2011 | Sheha et al. |
| 2006/0238380 | A1 | 10/2006 | Kimchi et al. |
| 2007/0176771 | A1 | 8/2007 | Doyle |
| 2008/0143604 | A1 | 6/2008 | Mock et al. |
| 2008/0186165 | A1 | 8/2008 | Bertagna et al. |
| 2009/0009398 | A1 | 1/2009 | Taylor et al. |
| 2009/0312032 | A1 | 12/2009 | Bornstein et al. |
| 2010/0148947 | A1 | 6/2010 | Morgan et al. |

OTHER PUBLICATIONS

"International Search Report", Mailed Date: Feb. 8, 2013, Application No. PCT/US2012/060091, Filed Date: Oct. 12, 2012, pp. 10.

Huang, et al., "On Geo-Social Network Services", Retrieved at <<http://ieeexplore.ieee.org/stamp/stamp.jsp?tp=&arnumber=5293492>>, 17th International Conference on Geoinformatics, Aug. 12-14, 2009, pp. 6.

Bareth, et al., "geoXmart—A Marketplace for Geofence-Based Mobile Services", Retrieved at <<http://ieeexplore.ieee.org/stamp/stamp.jsp?tp=&arnumber=5676340>>, 34th Annual IEEE Computer Software and Applications Conference, Jul. 19-23, 2010, pp. 101-106.

Reclus, et al., "Geofencing for Fleet & Freight Management", Retrieved at <<http://ieeexplore.ieee.org/stamp/stamp.jsp?tp=&arnumber=5399328>>, 9th International Conference on Intelligent Transport Systems Telecommunications, Oct. 20-22, 2009, pp. 353-356.

(Continued)

*Primary Examiner* — Dao Phan (74) *Attorney, Agent, or Firm* — Andrew Sanders; Micky Minhas (57) ABSTRACT

Embodiments enable geofencing applications and beacon watch lists. A computing device with at least a first processor and a second processor identifies a set of beacons associated with a geofence. The first processor consumes less power when operating than the second processor. The first processor is provided with the identified set of beacons. In beacon watch list embodiments, the first processor detects one or more beacons proximate to the computing device, compares the detected beacons with the provided set of beacons to determine whether the computing device is within the geofence, and updates a location status based on the comparison. In tiered geofencing implementations, the computing device switches among positioning modalities based on a distance from the computing device to the geofence to save power.

20 Claims, 7 Drawing Sheets

(56) References Cited

OTHER PUBLICATIONS

Unknown, "Google Latitude," Retrieved at <<http://www.google.com/mobile/latitude/>>, Retrieved on Jul. 8, 2011, pp. 2.

Unknown, "Loopt Advances Communication and Discovery Tools, Re-designs Application," Retrieved at <<http://about.loopt.com/2010/12/loopt-advances-communication-and-discovery-tools-re-designs-application/>>, Dec. 6, 2010, pp. 4.

Unknown, "foursquare: Privacy 101," Retrieved at <<https://foursquare.com/privacy/>>, Dec. 20, 2010, pp. 2.

POWER-AWARE TIERED GEOFENCING AND BEACON WATCHLISTS

BACKGROUND

Geofencing may be implemented in existing systems in several ways, one of which relies on location polling. A mobile telephone continually polls for its location and that location is compared to the location of an area of interest to determine whether the mobile telephone is within the area of interest. Example areas of interest may include a home, workplace, or a nearby friend. While effective, the existing systems are battery intensive thus degrading the user experience. For example, many applications request near real-time updates of the location of the mobile telephone even when the mobile telephone is far away from the areas of interest.

SUMMARY

Embodiments of the disclosure provide power-aware tiered geofencing. A computing device identifies a set of beacons associated with a geofence. The computing device has at least a first processor and a second processor, wherein the first processor consumes less power when operating than the second processor. The first processor is provided with the identified set of beacons. The second processor is disabled while the first processor detects one or more beacons proximate to the computing device using a first one of a plurality of positioning modalities. The first processor further compares the detected beacons with the provided set of beacons to determine whether the computing device is within or nearby the geofence. Based on the comparison, a second one of the plurality of positioning modalities is selected. The second processor is enabled based on the selected second one of the plurality of positioning modalities. The computing device implements the selected second one of the plurality of positioning modalities to detect additional beacons.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure support power-aware geofencing applications in multi-processor devices. Some embodiments enable real-time or near real-time notifications whenever a computing device 202 enters and/or exits a virtual perimeter defined by a geofence. Further, with tiered geofencing, the computing device 202 (e.g., a mobile computing device 104) saves power by switching among different methods of location determination (e.g., via different positioning modalities) having different levels of power consumption. For example, implementing Wi-Fi or satellite-based positioning consumes more power than implementing cellular-based positioning. The switching is dependent on a current location of the computing device 202, a distance from the computing device 202 to the geofence(s), an error range or accuracy of the positioning modality and/or beacon, the size of the geofences, and/or other factors.

The geofencing applications may be implemented with or without location determination (e.g., using positioning modalities that may either determine location or detect proximity to beacons 204). In some embodiments, when the computing device 202 is far from the geofence, aspects of the disclosure disable the high power processor(s) and rely on the low power processor(s) to monitor the location of the computing device 202. When the computing device 202 approaches the geofence, aspects of the disclosure implement higher accuracy methods of monitoring. When the computing device 202 is once again far away from the geofence, the greater power-consuming positioning modalities are disabled again. In this manner, low power and low accuracy positioning modalities are used to determine whether to switch to higher power and higher accuracy positioning modalities, thus reducing power consumption by the computing device 202.

In some embodiments, rather than calculating and analyzing the location of the computing device 202 to determine whether the computing device 202 is within or nearby a geofence, aspects of the disclosure compare detected proximate beacons 204 to a set of beacons associated with the geofence. In this manner, the entry or exit of the computing device 202 relative to the geofence can be determined by a lower power positioning modality without calculating the actual location of the computing device 202. This allows the higher-power-consumption positioning modalities to remain disabled until a geofence entry event or geofence exit event is triggered, or the device is known to be nearby the geofence. Power is thus conserved over existing methods. A user 206 of the computing device 202 is also able to associate location status privacy settings with the geofence or other beacons 204 (e.g., for sharing location status with other users).

Figure 1:
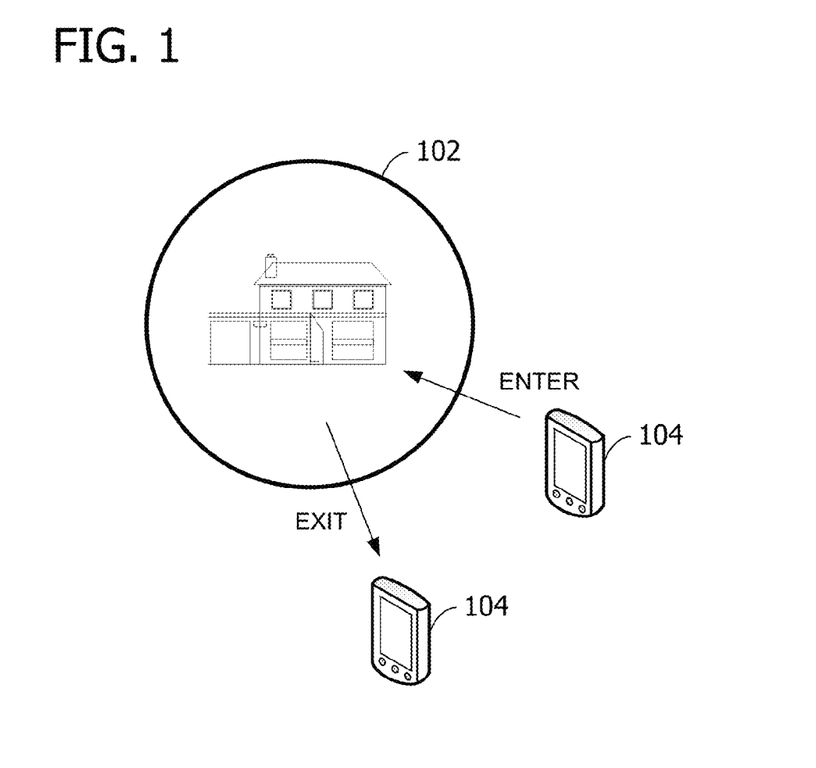
FIG. 1 is an exemplary block diagram illustrating a mobile computing device entering and exiting a geofence around a house.

Referring next to FIG. 1, an exemplary block diagram illustrates the mobile computing device 104 entering and exiting a geofence 102 around a house. In general, the geofence 102 represents a virtual perimeter of a geographic area of interest. While the geofence 102 illustrated in FIG. 2 and elsewhere is represented by a circle, aspects of the disclosure are operable with any size or shape of geofence 102. Aspects of the disclosure are further operable with geofences in both two- and three-dimensions. For example, a geofence may be established around one or more floors of an office building.

Figure 2:
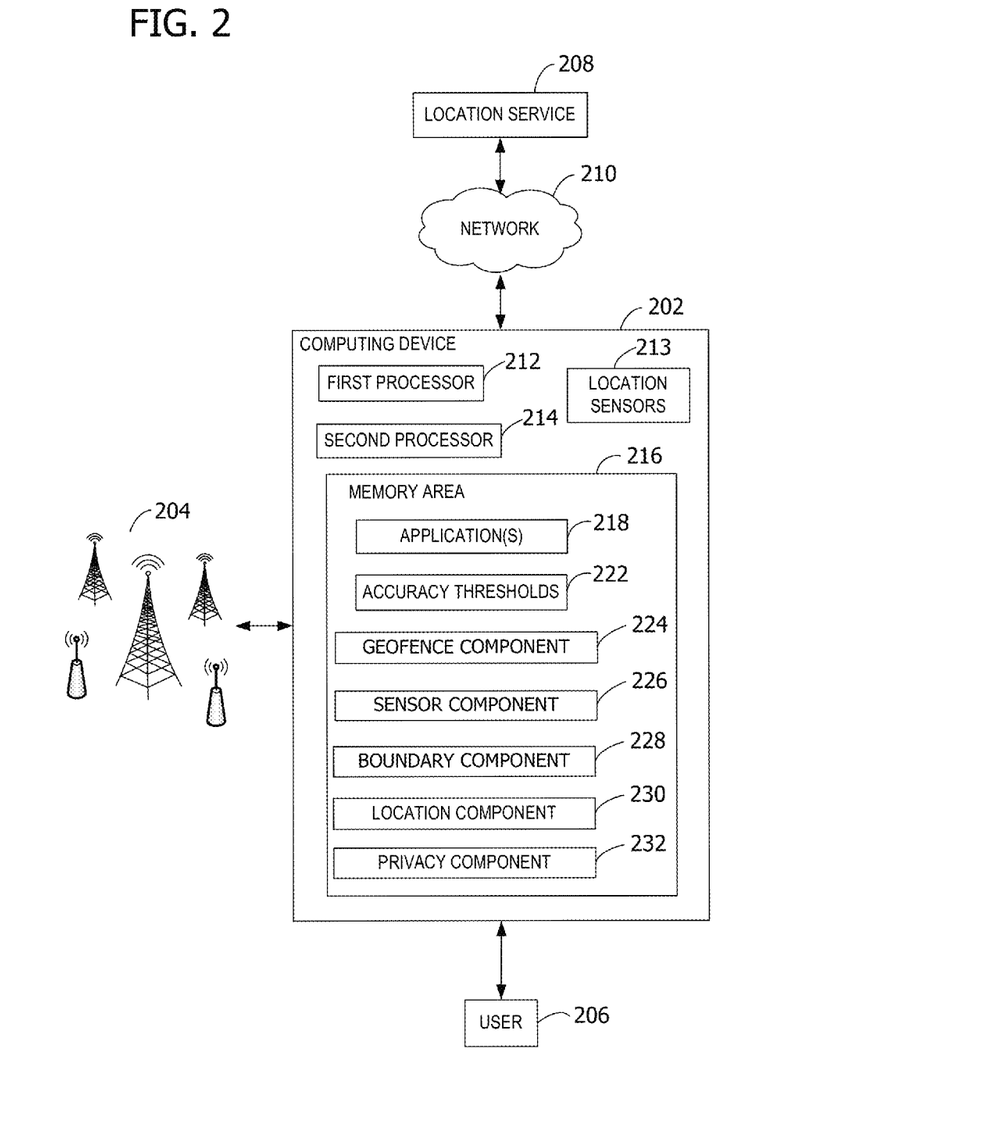
FIG. 2 is an exemplary block diagram illustrating operation of the computing device to detect beacons and select a positioning modality.
Figure 3:
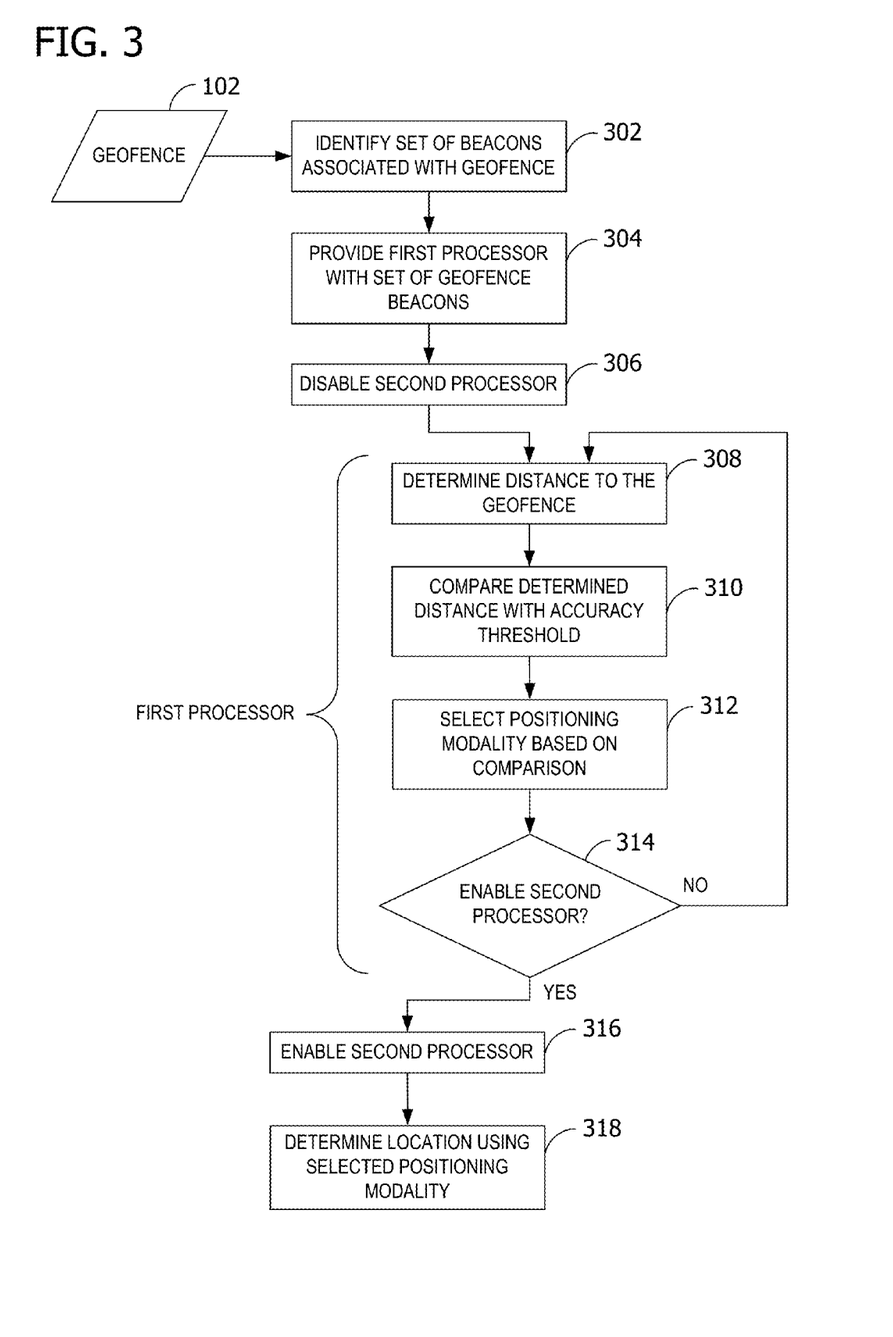
FIG. 3 is an exemplary flow chart illustrating operation of the computing device to select a positioning modality based on a determined distance from a geofence.
Figure 4:
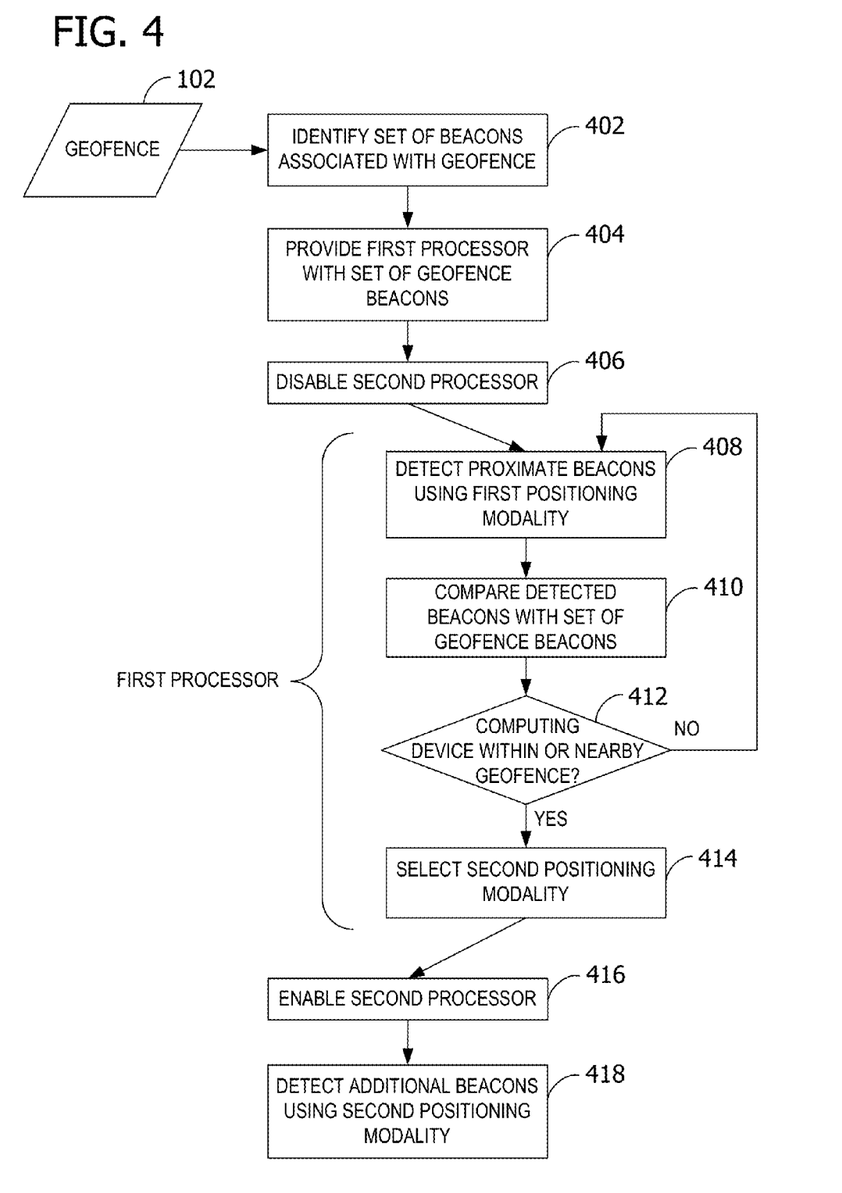
FIG. 4 is an exemplary flow chart illustrating operation of the computing device to implement beacon watch lists.

While some aspects of the disclosure disclose the mobile computing device 104 performing operations such as shown in FIG. 3 and FIG. 4, the disclosure is operable with any computing device capable of entering and exiting the geofence. Such an exemplary computing device is described next with reference to FIG. 2.

Referring next to FIG. 2, an exemplary block diagram illustrates operation of the computing device 202 to detect beacons 204 and select a positioning modality. The computing device 202 (e.g., a mobile telephone) detects or observes one or more of the beacons 204 including cellular towers (or sectors if directional antennas are employed) such as for cellular division multiple access (CDMA), wireless fidelity (Wi-Fi) access points, satellites, or other wireless access points (WAPs) such as for the Global System for Mobile Communication (GSM) and 4G/Wi-Max via one or more location sensors 213 of the computing device 202. In general, exemplary beacons 204 include cellular towers, base stations, base transceiver stations, base station sites, and/or any other network elements supporting any quantity and type of communication modes. While some embodiments of the disclosure may be described with reference to the beacons 204 implementing protocols such as the 802.11 family of protocols, embodiments of the disclosure are operable with any beacon 204. For example, beacons 204 may include ultrasonic beacons.

In embodiments that contemplate determining the location of the computing device 208, after selecting the positioning modality, the computing device 202 communicates with a location service 208 via a network 210 to determine the location of the computing device 202. In other embodiments, the location service 208 is part of or otherwise associated with the computing device 202. In such embodiments, the computing device 202 is able to determine the location of the computing device 202 without external communication with the location service 208.

The location service 208 implements location determination algorithms based on input from the computing device 202. For example, the location service 208 may implement satellite-based positioning, cellular-based positioning, Wi-Fi-based positioning, BLUETOOTH-based positioning, and the like, based on input received from the computing device 202. With beacon-based location determination, a list of nearby beacons 204 (e.g., Wi-Fi beacons or cell towers) is collected. The location of each of the beacons 204 can be looked up using a unique identifier such as an address of each beacon 204. The position of the computing device 202 can be estimated based on the proximity to each of the beacons 204 in the set and the known locations of the beacons 204.

In the example of FIG. 2, the computing device 202 associated with the user 206 represents a system for power-aware tiered geofencing. The computing device 202 represents any device executing instructions (e.g., as application programs, operating system functionality, or both) to implement the operations and functionality associated with the computing device 202. The computing device 202 may include the mobile computing device 104 or any other portable device. In some embodiments, the mobile computing device 104 includes a mobile telephone, laptop, tablet, computing pad, netbook, gaming device, and/or portable media player. The computing device 202 may also include less portable devices such as desktop personal computers, kiosks, and tabletop devices. Additionally, the computing device 202 may represent a group of processing units or other computing devices. As described above with reference to FIG. 1, the computing device 202 represents any device capable of entering and exiting the geofence.

In some embodiments (not shown), the computing device 202 includes a single processor. In other embodiments, the computing device 202 has at least two processors, one or more sensors, and a memory area 216. For example, the processors include a first processor 212 and a second processor 214, where the first processor 212 consumes less power when operating than the second processor 214. For example, the first processor 212 may be a modem processor while the second processor 214 is a primary processor. The first processor 212 may be a processor designed to consume less power than the second processor 214. Alternatively or in addition, the first processor 212 may be a processor similar to the second processor 214 except that the first processor 212 has transitioned to a low power state by, for example, disabling selected hardware functionality (e.g., caches), reducing the clock speed, or any other known method for reducing power consumption.

An exemplary computing device 202 may have a plurality of processors including a primary processor, a graphics processing unit, a Wi-Fi chipset, a BLUETOOTH chipset, a cellular modem or radio, and others. Some of the processors consume more power than others, and there may be a power consumption cost incurred when one of the processors switches from a low power state to a higher power state (or vice versa).

In general, the processors include any quantity of processing units, and are programmed to execute computer-executable instructions for implementing aspects of the disclosure. The instructions may be performed by the processors or by multiple processors executing within the computing device 202, or performed by one or more processors external to the computing device 202. In some embodiments, the processors are programmed to execute instructions such as those illustrated in the figures (e.g., FIG. 3 and FIG. 4).

The computing device 202 also has one or more location sensors 213 associated therewith. The location sensors 213 may be internal and/or external to the computing device 202. Exemplary location sensors 213 include, but are not limited to, a cellular radio or modem, a GPS receiver, a Wi-Fi adapter or modem, a BLUETOOTH brand communication service element, a three-dimensional motion sensor, or the like.

The computing device 202 further has one or more computer readable media such as the memory area 216. The memory area 216 includes any quantity of media associated with or accessible by the computing device 202. The memory area 216 may be internal to the computing device 202 (as shown in FIG. 2), external to the computing device 202 (not shown), or both (not shown).

The memory area 216 stores, among other data, one or more applications 218. The applications 218, when executed by one or more of the processors, operate to perform functionality on the computing device 202. Exemplary applications 218 include mail application programs, web browsers, calendar application programs, address book application programs, messaging programs, media applications, location-based services, search programs, and the like. The applications 218 may communicate with counterpart applications or services such as web services accessible via the network 210. For example, the applications 218 may represent downloaded client-side applications that correspond to server-side services executing in a cloud.

In some embodiments, one or more of the applications 218 rely on information describing a location of the computing device 202. The location may represent a status (e.g., inside and/or outside the geofence) or an actual determination location (e.g., coordinates). The applications may perform particular actions based on the determined location of the computing device 202 relative to the geofence. Examples of the execution of such applications are described below.

The memory area 216 further stores accuracy thresholds corresponding to the positioning modalities and/or the beacons. The accuracy thresholds are defined based on implementation of the various positioning modalities (e.g., an error range or accuracy value) and, in some embodiments, the size of the geofence. In some embodiments, the positioning modalities correspond to the location sensors 213. For example, the positioning modalities include cellular-based positioning, satellite-based positioning, Wi-Fi-based positioning, and BLUETOOTH-based positioning.

Each of the positioning modalities has one of the accuracy thresholds 222 associated therewith. In some embodiments, the accuracy threshold 222 represents a range or accuracy of the positioning modality. In other embodiments, the accuracy threshold 222 represents a range or accuracy of a particular beacon or beacon type. Exemplary accuracy thresholds 222 include approximately two kilometers for cellular-based location determination, approximately 250 meters for Wi-Fi-based location determination, and approximately five meters for satellite-based location determination. The accuracy threshold 222 may be defined based on empirical data from the computing device 202 or other computing devices (e.g., based on a success rate of previous applications or implementations of the positioning modality).

The memory area 216 further stores one or more computer-executable components. Exemplary components include a geofence component 224, a sensor component 226, a boundary component 228, a location component 230, and a privacy component 232. Operation of the components, when executed, is described below with reference to FIG. 4.

Referring next to FIG. 3, an exemplary flow chart illustrates operation of the computing device 202 to select a positioning modality based on a determined distance from the geofence 102. In other embodiments (e.g. see FIG. 4), distance from the geofence 102 is not explicitly determined, but whether the computing device 202 is within, nearby and potentially inside, or not inside the geofence 102.

At 302, the computing device 202 identifies a set of beacons associated with the geofence 102 or other area of interest. For example, the computing device 202 may identify one or more beacons 204 having a radius that overlaps with or is contained within a geographic area associated with the geofence 102.

In some embodiments, the computing device 202 queries the location service 208 or another entity (e.g., a cloud service) to obtain the set of beacons and store the set of beacons on the computing device 202. In some embodiments, the location service 208 maintains a beacon database (e.g., or in a file or in memory) that includes the approximate location and range of each beacon 204. Based on the location of the geofence(s) of interest, the location service 208 can query or filter the beacon database to identify the beacons 204 that intersect or are contained within the geofence 102. Alternatively or in addition, the computing device 202 may access the memory area 216 to build the set of beacons. The set of beacons may include beacons 204 of any type (e.g., cellular, Wi-Fi, etc.) and of any combination of types.

In some embodiments, the identified set of beacons represents possible areas of interest to the user 206, and may include a plurality of geofences 102. The set of beacons may also be referred to as a beacon watch list.

At 304, the set of beacons is provided to the first processor 212 or another low power processor. For example, the first processor 212 may be provided a pointer or register value indicating where the set of beacons is available for access. At 306, the second processor 214, or any other processor consuming more power than the first processor 212, is disabled to reduce power consumption. Disabling the second processor 214 includes, for example, de-energizing the second processor 214, setting the second processor 214 to a low power mode, or otherwise adjusting the second processor 214 to consume less power. In this manner, the second processor 214 may be disabled indefinitely until enabled as described below.

After receiving or being notified of the set of beacons, the first processor 212 determines a distance from the computing device 202 to the geofence 102 at 308. For example, the first processor 212 obtains a location of the computing device 202 using one of the positioning modalities capable of implementation by the first processor 212. The first processor 212 compares the location of the computing device 202 with the locations and/or coverage of the beacons 204 in the set of beacons defining the geofence 102 to calculate the distance from the computing device 202 to the geofence 102. The computing device 202 may be moving towards the geofence 102, moving away from the geofence 102, or stationary.

For example, at 310, the first processor 212 compares the determined distance with the accuracy thresholds 222 associated with each of the positioning modalities, or associated with the particular location determination fix (e.g., from 308). At 312, based on the comparison, the first processor 212 selects one of the positioning modalities. In some embodiments, the first processor 212 selects one or more of the positioning modalities having accuracy thresholds 222 that are greater than the determined distance. For example, if the determined distance is greater than the accuracy threshold 222 using a first one of the positioning modalities but less than the accuracy threshold 222 using a second one of the positioning modalities, then the first processor 212 selects the second positioning modality. In some embodiments, if the difference between the determined distance and one of the accuracy thresholds 222 is a small value such that the moving computing device 202 may be within or nearby the accuracy threshold 222 soon, the first processor 212 may switch to a positioning modality with a smaller accuracy threshold 222 (e.g., higher accuracy).

The first processor 212 identifies the processor(s) needed for implementing the selected positioning modality to determine whether to enable the second processor 214 at 314. If the positioning modality is the same positioning modality employed at 308, the second processor 214 is not enabled. Otherwise, if the first processor 212 determines that the second processor 214 should be enabled at 314, the second processor 214 is enabled at 316. For example, the first processor 212 may send a notification to the second processor 214 to enable the second processor 214. While discussed in the context of the first processor 212 and the second processor 214, aspects of the disclosure are operable with any quantity of processors.

At 318, the location of the computing device 202 is determined using the selected positioning modality. For example, at least the second processor 214 proceeds to perform operations 308, 310, 312, 314, and 316 (in some cases).

In some embodiments, the computing device 202 calculates or receives a success rate associated with use of the selected positioning modality. The success rate may be represented as a value indicating whether a location could be determined, a radius of error associated with the determined location, speed of the fix, or another metric. In such embodiments, the computing device 202 analyzes the success rate and may adjust any of the accuracy thresholds 222 to be greater or less depending on the success rate.

Referring next to FIG. 4, an exemplary flow chart illustrates operation of the computing device 202 to implement beacon watch lists. In some embodiments, the operations illustrated in FIG. 4 are performed using a beacon watch list and without determining a location of the computing device 202. In contrast to polling for the location of the computing device 202 (e.g., such as in FIG. 3), the beacon watch list enables a geofencing implementation with reduced power consumption by the computing device 202 due to the lack of location polling. At 402, the computing device 202 identifies a set of beacons associated with the geofence 102. For example, the computing device 202 may query the location service 208 or another entity to obtain the set of beacons. At 404, the set of beacons is provided to the first processor 212 or another low power processor. At 406, the second processor 214, or any other processor consuming more power than the first processor 212, is disabled to reduce power consumption.

After receiving or being notified of the set of beacons, the first processor 212 detects one or more beacons 204 proximate to the computing device 202 at 408 using a first positioning modality (e.g., cellular-based). The first processor 212 compares the detected beacons 204 with the set of beacons associated with the geofence 102 at 410 to determine if the computing device 202 is within or nearby the geofence 102. For example, the first processor 212 determines if one of the detected beacons 204 is also part of the set of beacons. If one of the detected beacons 204 is also in the set of beacons, the first processor 212 determines whether the range or coverage area of that beacon 204 is entirely within the geofence 102. If so, the first processor 212 concludes that the computing device 202 is within the geofence 102. The first processor 212 may instead determine that the range of the beacon 204 is partly within the geofence 102 and that the range is within a margin of error. If so, the first processor 212 concludes that the computing device 202 is within the geofence 102. The first processor 212 may instead determine that the range of the beacon 204 is partly within the geofence 102 and that the range is greater than the margin of error. If so, the first processor 212 concludes that a different beacon type with greater accuracy (e.g., Wi-Fi instead of cellular) should be detected to determine whether the computing device 202 is within the geofence 102 (e.g., see operations 314, 316, and 318 in FIG. 3).

If the first processor 212 determines that the computing device 202 is not within or nearby the geofence 102 at 412, the first processor 212 subsequently re-performs operations 408, 410, and 412 using the same positioning modality (e.g., the first positioning modality). For example, the first processor 212 may detect other beacons 204 after a predefined time period elapses (e.g., every ten seconds, every five minutes, every hour, etc.). In another example, the first processor 212 may reduce the frequency of re-performing the operations (e.g., by a back-off factor or amount). In some embodiments, the frequency reduction is tied to a determination or signal that the user 206 is stationary (e.g., based on detecting the same set of beacons more than once, or based on accelerometer data).

If the first processor 212 determines that the computing device 202 is within or nearby the geofence 102 at 412, the first processor 212 selects a second positioning modality (e.g., Wi-Fi-based) at 414. If the second processor 214 is needed for implementation of the selected second positioning modality, the second processor 214 is enabled at 416. Enabling the second processor 214 includes, but is not limited to, energizing the second processor 214, setting or configuring the second processor 214 to a higher power or full power mode, adjusting the second processor 214 to consume more power, waking the second processor 214, or interrupting the second processor 214.

The computing device 202 detects additional beacons (e.g., of the type corresponding to the second positioning modality) at 418 to enable location determination with greater accuracy.

Further, the computing device 202 may perform any operation associated with entry into, or exit from, the geofence 102. For example, the computing device 202 may update a location status based on whether or not the computing device 202 is within the geofence 102. In some embodiments, the computing device 202 updates the location status after determining whether the computing device 202 is within or nearby the geofence 102 at 412, and without performing operations 414, 416, or 418.

In another example, the computing device 202 may create a tag for association with content (e.g., photos) created or captured by the computing device 202 while within the geofence 102. The tag provides context information based on the updated location status. The tag may be created from user data stored on the computing device 202 (e.g., from data provided by the user 206 describing the geofence 102), or may be created from data obtained from another source such as the Internet.

In some embodiments, the computer-executable components illustrated in FIG. 2 are executed by the first processor 212 or the second processor 214 to perform the operation illustrated in FIG. 4. For example, the geofence component 224, when executed by the first processor 212, causes the first processor 212 to identify the set of beacons associated with the geofence 102. The sensor component 226, when executed by the first processor 212, causes the first processor 212 to detect one or more beacons 204 proximate to the computing device 202. The boundary component 228, when executed by the first processor 212, causes the first processor 212 to compare the beacons 204 detected by the sensor component 226 with the set of beacons identified by the geofence component 224 to determine whether the computing device 202 is within or nearby the geofence 102. In some embodiments, the geofence component 224, the sensor component 226, and the boundary component 228 execute while the second processor 214 is disabled. The location component 230, when executed by the first processor 212, causes the first processor 212 to enable the second processor 214 based on whether the computing device is within or nearby the geofence 102 as determined by the boundary component 228. In some embodiments, at least the second processor 214 executes to detect additional beacons to update a location status of the computing device 202.

In some embodiments, the privacy component 232, when executed by the computing device 202, enables the user 206 to set privacy settings. The privacy settings may be based on the location status (e.g., whether or not the computing device 202 is within the geofence 102). For example, the user 206 may specify that information describing whether or not the computing device 202 is within one of the geofences 102 may be shared, but that real-time tracking information for the computing device 202 may not be shared.

Figure 5:
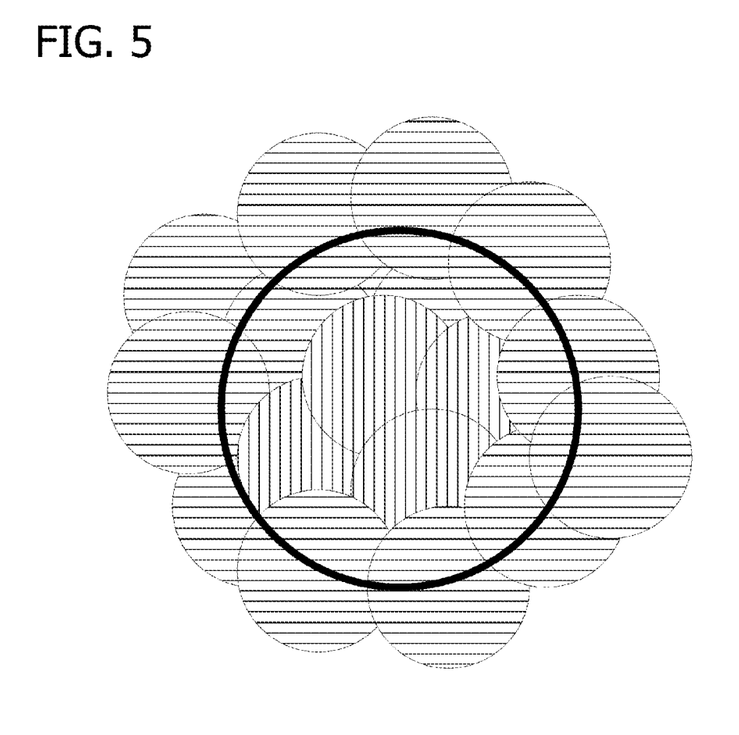
FIG. 5 is an exemplary block diagram illustrating beacon coverage around a geofence.

Referring next to FIG. 5, an exemplary block diagram illustrates beacon coverage around a geofence. In the example of FIG. 5, the circle indicated by the solid line represents the geofence. The other circles represent the range and position of beacons 204 that intersect or are contained within the geofence. In particular, the circles with the horizontal crosshatch pattern represent beacons 204 whose coverage overlaps with the geofence (e.g., part of the coverage is within the geofence, while the rest of the coverage is outside the geofence). The computing device 202 encounters these beacons 204 first as the computing device 202 approaches the geofence, and these beacons 204 last as the computing device 202 exits the geofence. The circles with the vertical crosshatch pattern represent beacons 204 whose coverage is contained entirely within the geofence. In the example of FIG. 5, the beacons 204 may be Wi-Fi beacons.

While the beacon coverage is represented by circles in FIG. 5 and elsewhere in the disclosure, actual beacon coverage differs among the beacons 204 and may take any form or shape.

Figure 6:
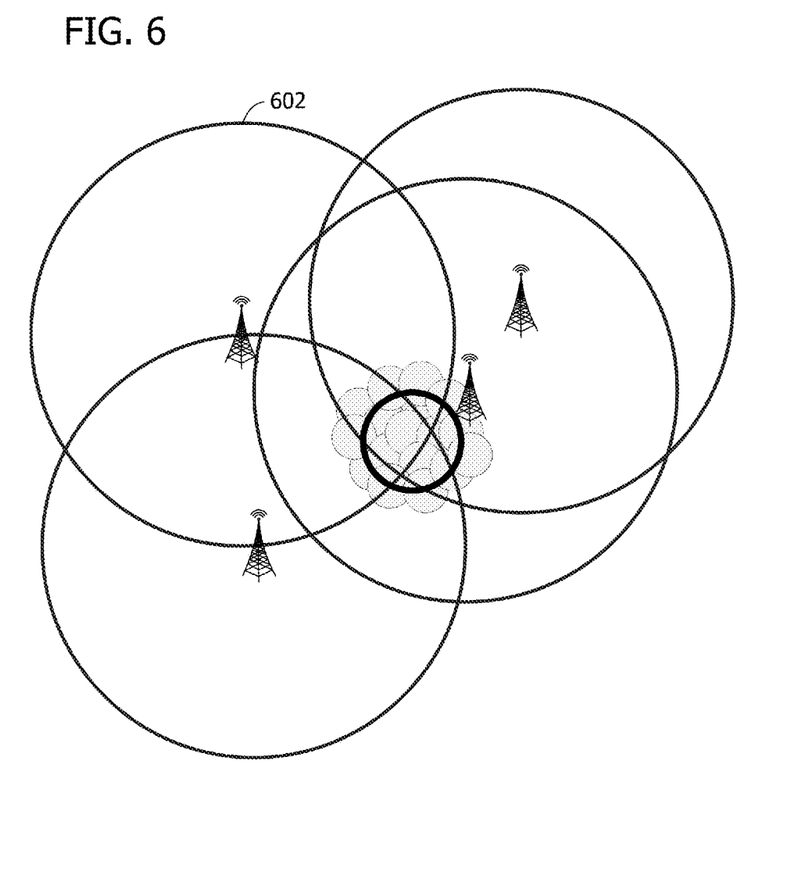
FIG. 6 is an exemplary block diagram illustrating cell tower coverage overlapping other beacon coverage near a geofence.

Referring next to FIG. 6, an exemplary block diagram illustrates cell tower coverage overlapping other beacon coverage near a geofence. In the example of FIG. 6, the small circles represent Wi-Fi beacons while the large circles (e.g., circle 602) represent cell towers with a broader coverage area (e.g., error radius) than the Wi-Fi beacons. The four cell towers and the Wi-Fi beacons are included in a beacon watch list stored by the computing device 202. As the computing device 202 approaches, the computing device 202 applies a cell-based positioning modality to detect proximate cell towers (e.g., a Wi-Fi modem is powered off to save power). If the computing device 202 is connected to a cell tower other than one of the four cell towers on the beacon watch list, the computing device 202 concludes that it is not near the geofence and that the Wi-Fi modem should remain powered off.

If the computing device 202 is connected to one of the four cell towers on the beacon watch list, the computing device 202 concludes that it may be near or within the geofence, but that a positioning modality with a higher accuracy (e.g., a smaller accuracy threshold 222, or a smaller margin of error) for location determination should be employed. As such, the computing device 202 then powers on the Wi-Fi modem to detect proximate Wi-Fi beacons (e.g., in addition to detecting proximate cell towers). Once the computing device 202 is no longer connected to one of the four cell towers, the computing device 202 powers off the Wi-Fi modem to conserve power and only uses the cellular radio to detect proximate beacons 204.

Figure 7:
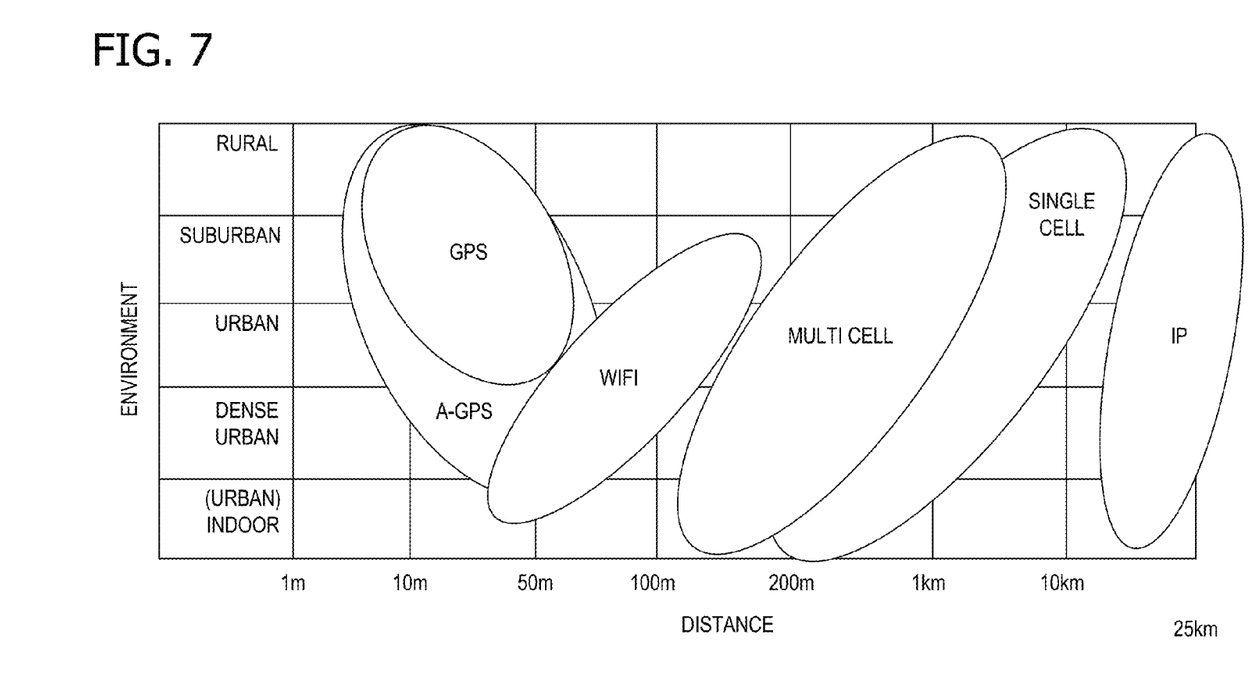
FIG. 7 is an exemplary chart illustrating coverage of various positioning modalities.

Referring next to FIG. 7, an exemplary chart illustrates coverage of various positioning modalities. Aspects of the disclosure are operable to switch among any known or future positioning modality. The exemplary modalities illustrated in FIG. 7 include satellite communication systems (e.g., GPS and assisted GPS), Wi-Fi communication systems, cellular communication systems (e.g., multi cell and single cell), and Internet protocol (IP) address-based positioning systems. With IP address-based positioning systems, the IP address of the user 206 is used to determine the region of the user 206.

Per the chart, the accuracy of the positioning modality decreases as the distance increases along the horizontal axis of the chart.

Additional Examples

Various geofencing applications are supported by aspects of the disclosure. In one example, the computing device 202 conserves power while providing real-time location tracking. In this example, because many users 206 are stationary or within a small set of locations (e.g., home, work, school) for a large part of the day, the geofencing implementation described in the disclosure conserves power by disabling real-time tracking hardware (e.g., GPS) upon entry to a geofence and enabling the real-time tracking hardware upon leaving the geofence.

In another example, aspects of the disclosure enable the user 206 to automatically "check-in" and automatically "check-out" from a venue (e.g., a coffee shop, store, restaurant, etc.) using the geofencing implementations described herein. In this example, a geofence is defined for each venue. In some embodiments, the user 206 is presented with an option to allow automatic check-in and/or check-out from each particular venue encountered or identified.

In yet another example, the geofencing implementations described herein present educated guesses as to venue context to include with media content created or captured by the computing device 202. The venue context includes, for example, information described a venue represented by a geofence the computing device 202 has entered. To improve the relevancy of the venue context, aspects of the disclosure may analyze the check-in history of the user 206 (users 206 often visit particular venues repeatedly) and social check-in data (users 206 are usually with friends if the user 206 is near the friends).

In still another example, aspects of the disclosure enable location tracking without giving an application access to a real-time location of the computing device 202. For example, the application requests access from the user 206 to know when the user 206 is at home or work. Geofences are then set up for the home and work locations, and notifications are sent to the application when the computing device 202 enters or exits the geofences. The list of geofences may be edited by the user 206.

At least a portion of the functionality of the various elements in FIG. 2 may be performed by other elements in FIG. 2, or an entity (e.g., processor, web service, server, application program, computing device, etc.) not shown in FIG. 2.

In some embodiments, the operations illustrated in FIG. 3 and FIG. 4 may be implemented as software instructions encoded on a computer readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users 206. In such embodiments, notice is provided to the users 206 of the collection of the data (e.g., via a dialog box or preference setting) and users 206 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules or other data. Computer storage media exclude propagated data signals. Communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for power-aware tiered geofencing with selectively implementation of the positioning modalities to reduce power consumption of the mobile computing device 104, and exemplary means for delegating a beacon watch list to the first processor 212 while disabling the second processor 212.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for power-aware tiered geofencing, said system comprising:
    a memory area associated with a mobile computing device, said memory area storing accuracy thresholds each associated with at least one of a plurality of positioning modalities; and
    a first processor programmed to disable a second processor, wherein the first processor consumes less power when operating than the second processor, and wherein the first processor is further programmed to perform the following operations while the second processor is disabled:
        determine a distance from the mobile computing device to a geofence using one of the positioning modalities;
        compare the determined distance with the accuracy threshold associated with said one of the positioning modalities;
        select at least one of the plurality of positioning modalities based on the comparison; and
        enable the second processor based on the selected positioning modality, wherein the mobile computing device implements the selected positioning modality to detect one or more beacons.

2. The system of claim 1, wherein the first processor is further programmed to adjust the accuracy thresholds for the positioning modalities based on observed success rates during prior use of the positioning modalities.

3. The system of claim 1, wherein the second processor is programmed to implement the selected positioning modality to determine a distance from the mobile computing device to the geofence.

4. The system of claim 1, wherein the mobile computing device defines each of the accuracy thresholds based on an accuracy of the positioning modality and a size of the geofence.

5. The system of claim 1, wherein the first processor is programmed to compare the determined distance with the accuracy threshold to determine whether the mobile computing device is inside the geofence and/or outside the geofence.

6. The system of claim 1, further comprising means for power-aware tiered geofencing with selectively implementation of the positioning modalities to reduce power consumption of the mobile computing device.

7. The system of claim 1, further comprising means for delegating a beacon watch list to the first processor while disabling the second processor.

8. A method comprising:
    identifying, by a computing device, a set of beacons associated with a geofence, said computing device having at least a first processor and a second processor, wherein the first processor consumes less power when operating than the second processor;
    providing the first processor with the identified set of beacons; and
    disabling the second processor, wherein the first processor performs the following operations while the second processor is disabled:
        detecting one or more beacons proximate to the computing device using a first one of a plurality of positioning modalities;
        comparing the detected beacons with the provided set of beacons to determine whether the computing device is within or nearby the geofence;
        based on the comparison, selecting a second one of the plurality of positioning modalities; and
        enabling the second processor based on the selected second one of the plurality of positioning modalities, wherein the computing device implements the selected second one of the plurality of positioning modalities to detect additional beacons.

9. The method of claim 8, wherein identifying the set of beacons associated with the geofence comprises identifying one or more beacons having a radius that overlaps with or is contained within the geofence.

10. The method of claim 8, wherein identifying the set of beacons associated with the geofence comprises:
   receiving the set of beacons from a cloud service; and
   storing the received set of beacons on the computing device.

11. The method of claim 8, wherein disabling the second processor comprises instructing the second processor to enter a low power mode.

12. The method of claim 8, wherein disabling the second processor comprises deenergizing the second processor.

13. The method of claim 8, wherein enabling the second processor comprises one or more of the following operations: waking the second processor, energizing the second processor, and interrupting the second processor.

14. The method of claim 8, wherein providing the first processor with the identified set of beacons comprises providing a modem processor with the identified set of beacons.

15. The method of claim 8, further comprising updating a location status based on whether the computing device is within the geofence.

16. The method of claim 15, further comprising tagging media content created by the computing device within the geofence with context based on the updated location status.

17. One or more computer storage devices embodying computer-executable components, said computer storage devices being associated with a computing device having at least a first processor and a second processor, said components comprising:
   a geofence component that when executed causes the first processor to identify a set of beacons associated with a geofence, wherein the first processor consumes less power than the second processor when operating;
   a sensor component that when executed causes the first processor to detect one or more beacons proximate to the computing device;
   a boundary component that when executed causes the first processor to compare the beacons detected by the sensor component with the set of beacons identified by the geofence component to determine whether the computing device is within or nearby the geofence, wherein said geofence component, said sensor component, and said boundary component execute while the second processor is disabled; and
   a location component that when executed causes the first processor to enable the second processor based on whether the computing device is within or nearby the geofence as determined by the boundary component, wherein at least the second processor executes to detect additional beacons to update a location status of the computing device.

18. The computer storage devices of claim 17, wherein the location component further performs location determination for the computing device using a positioning modality.

19. The computer storage devices of claim 18, further comprising a privacy component that, when executed, causes the computing device to provide another computing device with the updated location status but without real-time location tracking information associated with the computing device.

20. The computer storage devices of claim 19, wherein the privacy component accesses privacy settings defined by a user of the computing device.

* * * * *